United States Patent [19]
Blatter et al.

[11] Patent Number: 5,841,987
[45] Date of Patent: Nov. 24, 1998

[54] SIMPLE BUS AND INTERFACE SYSTEM FOR CONSUMER DIGITAL EQUIPMENT

[75] Inventors: Harold Blatter, Indianapolis; William Wesley Beyers, Jr., Greenfield; Michael Scott Deiss, Zionsville, all of Ind.

[73] Assignee: Thomson Consumer Electronics, Inc., Indianapolis, Ind.

[21] Appl. No.: 973,732
[22] PCT Filed: May 23, 1996
[86] PCT No.: PCT/US96/07391
§ 371 Date: Nov. 24, 1997
§ 102(e) Date: Nov. 24, 1997
[87] PCT Pub. No.: WO97/00579
PCT Pub. Date: Jan. 3, 1997

Related U.S. Application Data

[63] Continuation-in-part of Ser. No. 292,908, Aug. 19, 1994.

[30] Foreign Application Priority Data

Jun. 14, 1995 [GB] United Kingdom ............... 9512068

[51] Int. Cl.[6] .................................................. G06F 16/153
[52] U.S. Cl. ............................... 395/200.66; 395/200.32
[58] Field of Search ................... 395/200.66, 200.32, 395/284, 289, 294

[56] References Cited

FOREIGN PATENT DOCUMENTS

| 0609578 | 8/1994 | European Pat. Off. . |
| 9409595 | 4/1994 | WIPO . |

*Primary Examiner*—Thomas Peeso
*Attorney, Agent, or Firm*—Joseph S. Tripoli; Joseph J. Laks; Francis A. Davenport

[57] ABSTRACT

A system for generating a signal for coupling digital audio, video and data signals in compressed form via a bus. A processing means formats the digital audio, video and data signals into superpackets for transmission via the bus. Each superpacket comprises a timestamp, and a transport packet, representative of the digital audio, video and data signals. The superpackets have a fixed duration and occur at variable intervals. Devices receive the superpacket signal and may utilize the timestamps for clock synchronization. A recording and replay device processes the variable superpacket signal occurrence for recording. Reproduced timestamps are utilized to control restoration of the superpacket signal to have substantially the duration and occurrence as when formatted for bus transmission. A simplified bus couples superpackets between devices. An indicia is added to a superpacket signal to provide automatic control of device bus interfaces. The automated interface control is also responsive to device control status.

18 Claims, 8 Drawing Sheets

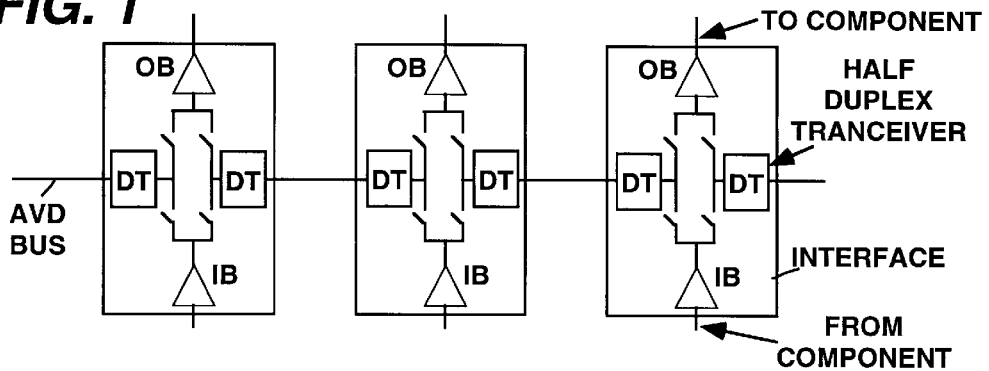
FIG. 1
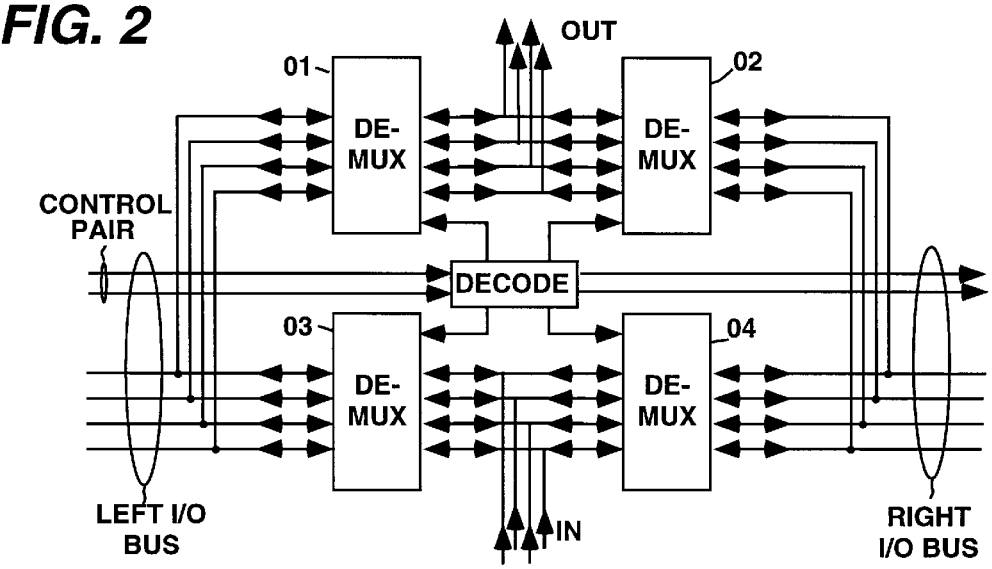
FIG. 2
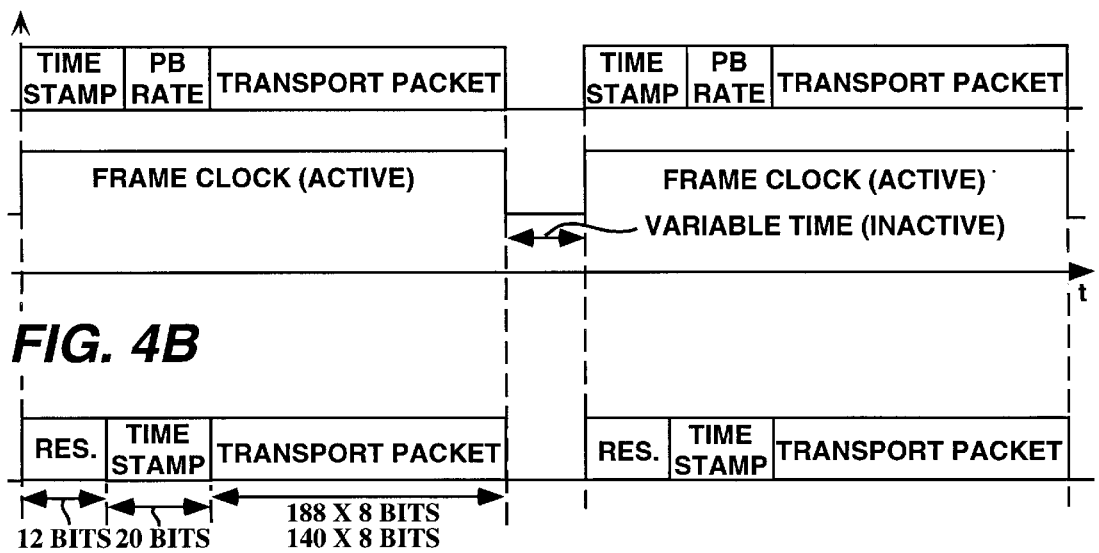
FIG. 4A
FIG. 4B

SIMPLE BUS AND INTERFACE SYSTEM FOR CONSUMER DIGITAL EQUIPMENT

This application is a continuation in part of application Ser. No. 08/292,908 filed Aug. 19, 1994, and A 371 of PCT/US96/07391 May 5, 1996 published as WO97/00579 Jan. 3, 1997.

This invention relates to a bus interface system/apparatus for coupling audio, video and data processing systems, and in particular to coupling digital signals for digital recording and reproduction.

BACKGROUND OF THE INVENTION

It is known in the audio/video electronics arts to interconnect a variety of consumer electronic processing devices on a bus structure, so that signal available at one device may be utilized by another device connected on the bus. For example audio/video signal available from a television receiver may be applied to a video cassette recorder for storage, or the audio from a television receiver may be applied to a component stereo system for reproduction etc. Examples of this type of audio/video interconnect systems may be found in U.S. Pat. Nos. 4,575,759; 4,581,664; 4,647,973; and 4,581,645.

The signals distributed in these analog bus systems are relatively self contained. That is they include all the timing information necessary for the respective devices connected to the bus to decode the respective signals.

Currently there are a number of compressed audio and video transmission systems, such as the Grand Alliance HDTV system proposed for terrestrial high definition television broadcasting, or the DirecTV™ system which currently broadcasts compressed NTSC signal via satellite. Both systems transmit program material in transport packets, and transport packets for different programs and/or program components may be time division multiplexed in a common frequency band. Respective packets undergo noise detection/correction encoding prior to transmission and after reception, and the transport packets are thereafter reconstituted in a receiver. Recording apparatus (e.g. VCR or video disc) and authoring apparatus (e.g. cameras or camcorders) for compressed signals, on the other hand, may process the compressed signals in the same packet format, however they may not require the same noise processing. As a consequence the conveyance of signal between processing components is most conveniently effected in packet form coupled via a bus. Processing components are coupled to the bus by bus interfaces which may provide bidirectional coupling to or from each processing component. The bus interfaces are coupled to a pair of control lines included in the bus which provides control communication from a master controller.

A simplified method for inter connection is required which eliminates the requirement for a master controller to be coupled via bus control conductors to each bus interface. Such a simplified inter connection method may provide automatic coupling of signal sources to signal destinations, and in addition may prevent two sources utilizing the same bus conductor. The simplified inter connection method may utilize a single pair of bus conductors.

SUMMARY OF THE INVENTION

An apparatus for controllably coupling a source of a packetized signal to a data bus. The apparatus comprises an indicia generator controllably coupled to the source and receiving therefrom the packetized signal. A switching matrix is controlled responsive to the indicia generator for receiving therefrom the packetized signal for coupling to the data bus. In responsive to the controllable coupling from the source, the indicia generator adds an indicia to the packetized signal and enables the switching matrix for coupling the packetized signal and indicia to the data bus.

BRIEF DESCRIPTION OF THE DRAWINGS

The invention will be described with reference to the following drawings wherein;

FIG. 1 is a block diagram of an inventive embodiment of a daisy chain connection of bus hardware including a number of bus/device interfaces; and FIG. 2 is a block diagram of a portion of one of the bus interfaces of FIG. 1.

FIG. 4A is a waveform and pictorial representation of bus superpackets according to a first arrangement, and FIG. 4B illustrates an alternative superpacket arrangement.

DETAILED DESCRIPTION

Referring to FIG. 1, there is shown a cascade of audio-video-data AVD bus interfaces interconnected by an AVD bus. Each interface is bidirectional in that it can be conditioned to provide signal to, or accept signal from a device component. However, it cannot do both concurrently, and will be conditioned to do one or the other for a session. Each interface includes an output buffer, OB, for driving a component device with signal provided by the bus. Each interface includes an input buffer, IB, for driving the bus with signal provided from the device component. Both the input and the output buffers are selectably coupled to the bus via switches which are controlled by a master controller. Thus the direction of applying signal to, or receiving signal from the bus may be determined with a high degree of flexibility.

Each interface may include a half duplex transceiver, at both connections to the AVD bus, for coupling signal from the bus to the interface. The bus includes a pair of control lines on which serial control signals are communicated from a master controller. The control signals may include addresses so that respective ones of the interfaces may be selectively controlled.

An exemplary interface switch apparatus is illustrated in FIG. 2. In this illustration, the AVD bus is presumed to consist of three line pairs or six conductors. All of the line pairs carry bit-serial signals. Two of the conductors, (the control pair) are consigned to carry the control signals. Each decoder carries a unique address which enables individual commands to be delivered to specific interfaces. Responsive to a control signal directed to the specific interface, the decoder outputs steering signals to the respective demultiplexers 01, 02, 03 and 04. The control signals determine: which of the respective bus conductors are coupled to the output port OUT, which are in turn coupled to the output buffer OB; and which of the respective bus conductors are coupled to the input port IN, which are in turn coupled to the input buffer IB; and which of the conductors will transit the interface between right and left input/output ports. The use of demultiplexers allows the daisy chain connection between components to be broken, permitting independent communications between components on either side of the break while employing the same conductors. Consequently a greater number of unique communications may be performed with fewer conductors in the bus structure.

Figure 3A:
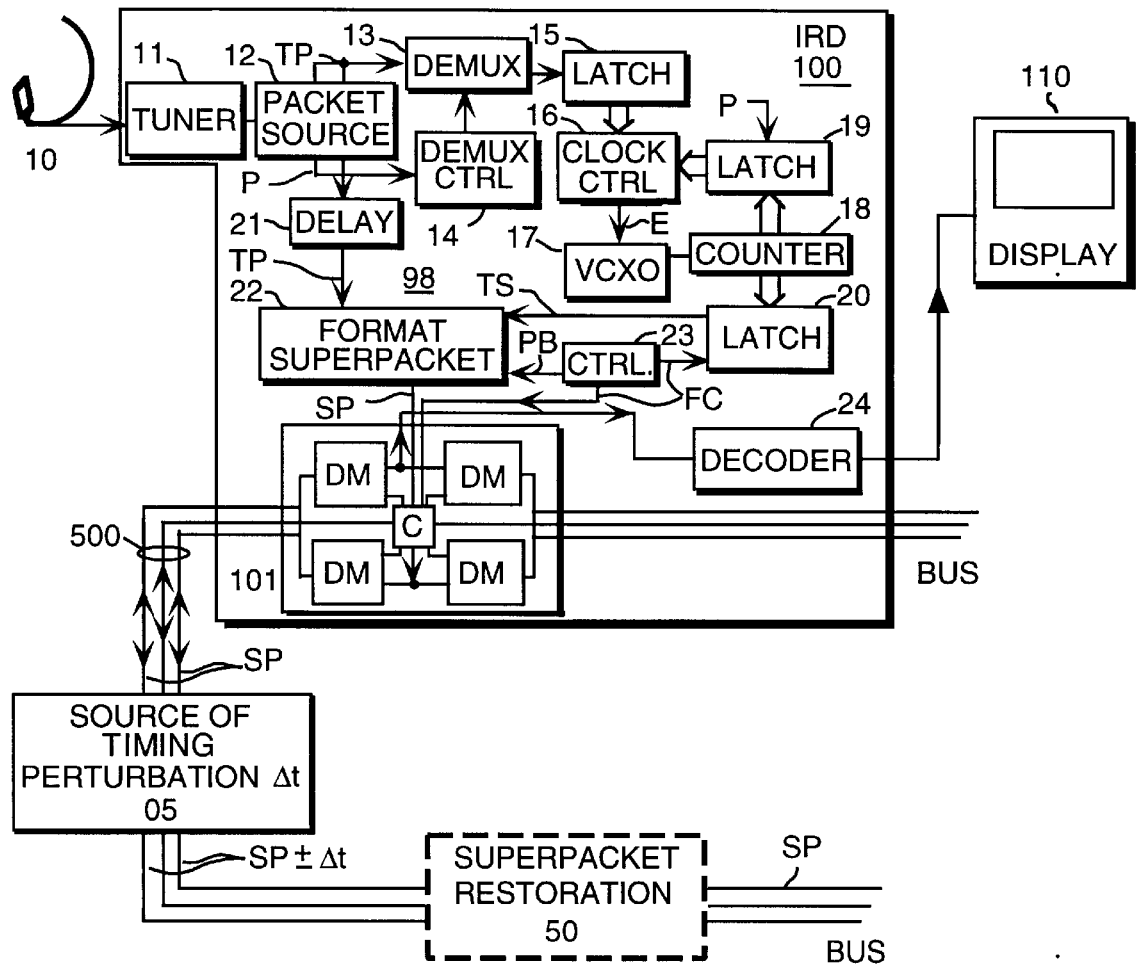
FIGS. 3A and 3B are a first system block diagram illustrating a receiver coupled via a data bus to a source of timing pertubation and and an inventive superpacket restoration block.

FIG. 3A illustrates a first exemplary system employing an integrated receiver decoder or IRD 100 which is coupled via the advantageous interface switch apparatus 101, as illustrated in FIGS. 1 and 2, to the AVD bus 500. A television receiver display 110 is coupled to IRD 100 and receives at either R.F., or base band video signals for display. The AVD bus 500 couples control signal data and two streams of signal format data.

In FIG. 3A it is assumed that the signal to be communicated is provided in the form of transport packets such as defined in the system layer of the MPEG2 video standard, or the transport layer of the Grand Alliance signal format. In both the MPEG2 video standard and the transport layer of the Grand Alliance signal format, transport packets are associated with timestamps or PCRs which allow re-synchronization of local system clocks to the original encoder clock frequency. Hence, having synchronized the local system clock generator, the transport packets may be processed to remove jitter or timing perturbations which may accumulate, for example, during transmission by switched bus structures and processing etc. However, transport packets may be subjected to jitter and timing discontinuities which may not be correctable based on the variable, and specified intermittent occurrence of timestamps in the transport stream. The AVD bus 500 is illustrated coupled to a source of timing pertubation, block 05 which may impart a timing error $\Delta t$ to the data streams present on the bus. The source of timing pertubations or jitter may result from bus switching, bus arbitration, timebase modulation, or recording and reproduction. AVD bus 500 with, timing error $\Delta t$, is coupled to block 50 which removes the timing error component, and restores the bus signal components.

To facilitate the removal of the timing error $\Delta t$ from the AVD signals, IRD 100 processes transport packets to form a further packet, designated herein as a superpacket, prior to transmission via AVD bus 500. Each superpacket includes a timestamp, the transport packet and a reserved data area which may include a playback rate code. Two timestamp embodiments are shown in FIGS. 4A and 4B. The timestamp is a timing code which is a sample of a clocked counter taken at a specific instant, for example, at the occurrence of a frame clock pulse. The timestamp may be utilized to facilitate correction of timing jitter and perturbations impressed on each superpacket and its contents. The playback rate code may be used by a recording device to determine the rate at which a particular signal is to be recorded or played back. The playback rate is coded relative to the recording rate and is read and utilized by any recording devices connected to the AVD bus. The purpose of the playback rate code is to allow recording at a relatively high bit rate and playback at a normal bit rate.

FIG. 3A depicts an integrated receiver decoder IRD 100 which receives a radio frequency signal from, for example, antenna 10 or a cable source, not shown. The RF signal is tuned by tuner 11 to receive and demodulate a user selected program. The tuner output packet stream is coupled to block 12, packet source, which separates the user's specific program transport stream TP from other program streams present in the received packet stream. The transport stream is coupled to a demultiplexer 13 where a program clock reference PCR value is extracted from the transport stream responsive to control by a demultiplexer controller 14. The demultiplexer controller 14 is controlled to extract the PCR by a packet timing pulse P which is coincident with and indicates the occurrence of respective transport packets. Packet timing pulse P is derived from the program transport stream by packet source 12. The PCR value, which is demuxed by block 13, is coupled for storage by latch 15.

A voltage controlled crystal oscillator 17 operates at a nominal clock frequency of 27 MHz and is controlled by a clock controller 16. A control signal E is generated responsive to a difference between the received PCR value, stored in latch 15, and a latched value derived by counting VCXO 17 in counter 18 and storing in latch 19. Thus VCXO 17 is synchronized by the received PCR value, which in turn is representative of the clock frequency at the time of encoding. Let the successive timestamp values be designated $TS_n$ and $TS_{n+1}$. Let corresponding successive count values stored in the latch 19 be designated $LCR_n$ and $LCR_{n+1}$. The clock controller 16 reads the successive values of TS's and LCR's and forms an error signal E proportional to the differences $$E => |TS_n - TS_{n+1}| - |LCR_n - LCR_{n+1}|$$

The error signal E, is applied as a control signal to condition the voltage controlled oscillator 17 to produce a frequency equal to the frequency of the system clock from which the PCRs were encoded. The error signal E produced by the clock controller 16 may be in the form of a pulse width modulated signal, which may be rendered into an analog error signal by low pass filtering, not shown. The constraints on this system are that the counters at each end of the system, namely encoder, decoder and recorder, count the same frequency or even multiples thereof. This requires that the nominal frequency of the voltage controlled oscillator be fairly close to the frequency of the system clock in the encoder.

It will be noted that the occurrence of transport packets generated as illustrated for example, in FIGS. 3, 5, 6 and 7 are synchronous with a system clock. The system clock was in turn synchronized with to an encoder clock via PCR's located within the transport stream and derived in packet source 12. The occurrence of these transport packets are time stamped in cooperation with the receiver synchronous clock, and the respective transport packets are tagged with the timestamps before application to the AVD bus.

The operation of superpacket generator 98 is as follows. A timestamp TS is formed in latch 20 which captures a counter value produced by counting oscillator VCXO 17 in counter 18. The latched counter value represents a frequency of VCXO 17 at an instant of an edge of a frame clock signal FC. Timestamp TS is coupled to block 22 where it is combined with control data, for example playback speed data PB from controller 23, and a delayed transport packet data TP from delay 21. The formatted superpacket SP is coupled from formatting block 22, of generator 98, for transmission via AVD bus 500 responsive to control by controller 23.

FIG. 4A is a pictorial representation of a superpacket signal as conveyed by AVD bus 500. A frame clock is provided on one of the bus conductors and may be used to indicate the occurrence or presence of a superpacket on another of the AVD bus conductors. When frame clock FC is in a high state, a superpacket is framed within and coincident with the high state. The high state or active interval of the frame clock is of constant duration for all packets, and in this example is equal to the duration of 191 eight bit bytes. These 191 bytes are divided between a 20-bit timestamp, a 4-bit playback rate code and a 188-byte transport packet. If a transport packet is less than 188-bytes it is loaded in the leading part of the transport packet portion of the superpacket. FIG. 4A illustrates a first sequence where the first 20 bits of data represent the timestamp, the second 4 bits represent the playback rate code and the final 188-bytes comprise the transport packet. FIG. 4B illustrates a second superpacket arrangement where the first sequence comprises 12 bits of reserved data, for example playback rate code, the second 20 bits represent the timestamp. The final portion of the superpacket comprises the transport packet. The superpacket stream occurrs in bursts with intervening gaps, where the bursts comprises the superpacket and transport packet etc., which may, for example, contain 140 or 188 bytes, representing DSS™ and MPEG packets respectively. The active portions of the Frame Clock are of constant duration, with inactive intervals of variable duration which correspond with gaps resulting from deleted or non-selected elemental streams. These variable periods of inactivity may provide considerable flexibility in the formation of superpackets.

Timestamps are samples of counts from a system clock oscillator which is assumed to run stably, without perturbation. Hence timestamp values, or oscillator samples, may be communicated for oscillator synchronization. Differences between adjacent timestamps values represent an elapsed number of oscillator cycles, which may alternatively be considered to represent an elapsed time interval. However, if the elapsed time interval between timestamps is disturbed or perturbed, ie. the occurrence, or spacing between timestamps is not the same as when encoded, the timestamp values can not be used to control or synchronize a "receiving" node oscillator.

Figure 3B:
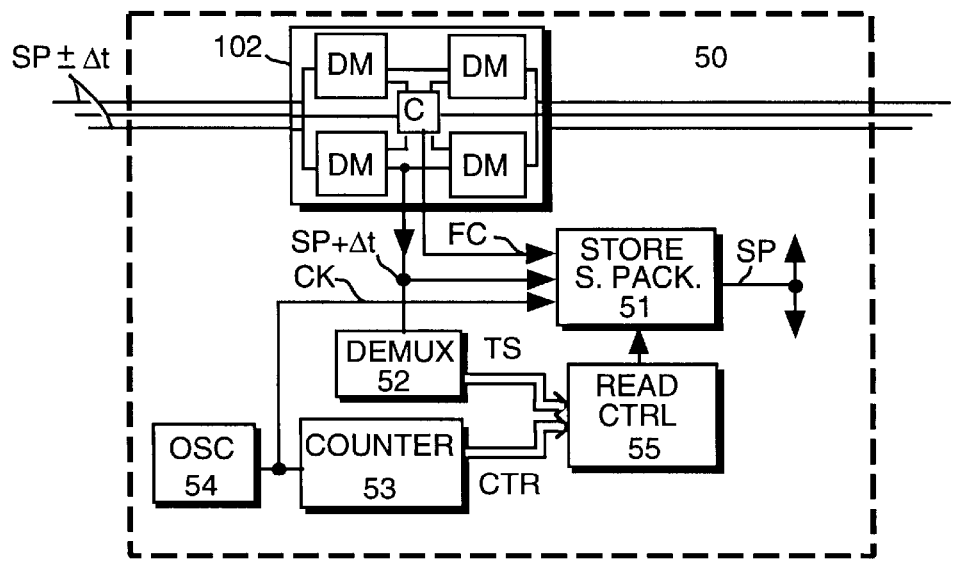

FIG. 3B illustrates in simplified form, processing employed within superpacket restoration block 50 which utilizes superpacket timestamp values to remove timing error $\Delta t$ impressed, for example, on signals coupled from AVD bus 500. The operation of superpacket restoration block 50 is as follows. The AVD bus 500 is received by interface switch apparatus 102 which is enabled, by a control signal on control conductors of bus 500. The superpacket signal with time perturbations SP+$\Delta t$, is coupled from the data bus to a demultiplexer DEMUX 52 which reads the timestamp from the superpacket. The superpacket signal is also coupled to a buffer store STORE S. PACK 51, which is controlled to store the superpacket responsive to a frame clock signal FC derived from the control conductors of AVD bus 500. An oscillator 54 has a stable free running frequency and has an output signal CK which is coupled to buffer store 51 and to counter 53. Oscillator 54 is required to have a nominal frequency which is fairly close to the frequency of the system clock in the encoder. The count value CTR, of counter 53 and the demultiplexed timestamp TS, are coupled to a buffer store read controller READ CTRL 55. The read controller compares the separated timestamp value with the free running oscillator count, and at coincidence generates a read, or output control signal. The output control signal is coupled to buffer store 51 which outputs the respective superpacket responsive to the control signal. In addition to re-establishing superpacket start time, the superpacket bit rate is restored by clock signals CK derived from oscillator 54. Thus, by means of the superpacket timestamp and the stable, free running oscillator, the timing error $\Delta t$ is removed and the timed occurrence of each superpacket SP is restored to occur at substantially the same time as when formatted by generator 98 of IRD 100. Since the superpacket is clocked out by a clock signal from oscillator 54, the superpacket has substantially the same bit rate as when formatted. Hence, since the superpacket occurrence and duration are restored to nominally the formatted values, thus too are the variable length, intervening gaps. The restored superpacket SP may be returned to AVD bus 500 for re-transmission to other bus interface switches beyond the the source of timing pertubation, or superpacket SP may be utilized within an apparatus of which superpacket restoration block 50 forms part.

In general, recording systems rely on signal presence or absence to provide an elementary level of signal loss detection. Additionally, continuous signal presence, particularly in a digital recording system is advantageous for data clock recovery. Since magnetic recording systems are subject to random signal losses of variable, and unpredictable duration, it is beneficial to employ a record signal having a constant bit or clock rate. Thus with such a recorded signal, periods of missing data may be considered representative of recording media losses.

Figure 5:
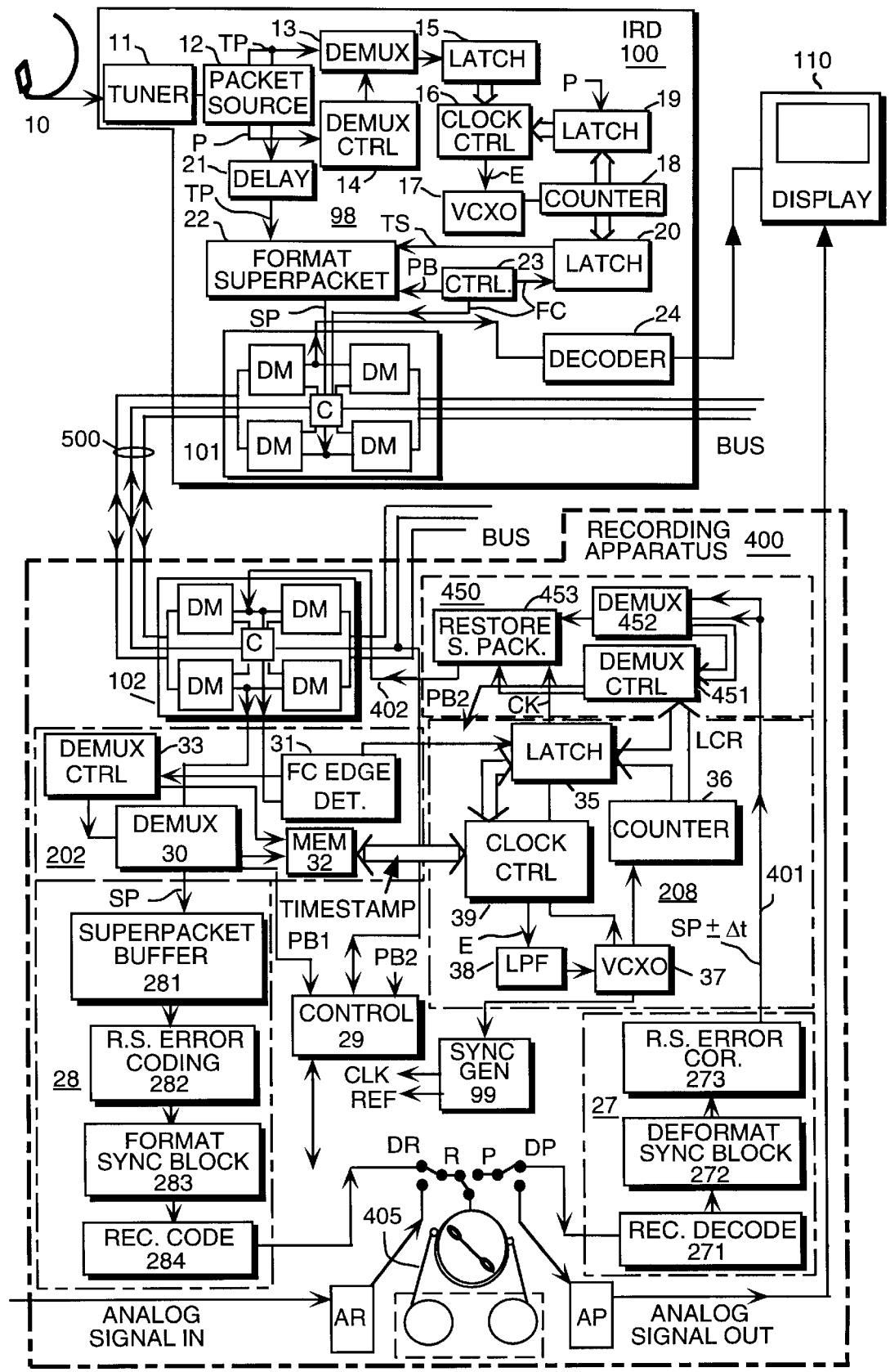
FIG. 5 is a system block diagram including a receiver coupled to a digital recording and replay device and employing various inventive embodiments.

In FIG. 5 bus interface 102 accepts bursts of superpackets from bus 500. The superpackets are coupled to signal sorter 202 which contains demultiplexer 30 for separating or reading the constituent parts of the superpacket. In the exemplary system of FIG. 3, superpackets, rather than transport packets are recorded on recording media 405. The superpackets, with variable length gaps, are coupled to a data buffer 281 which forms part of recording circuitry 28. Data buffer 281 and associated circuitry may be clocked with signals derived from a sync generator 99. Sync generator 99 may be synchronized by clock signals generated by a stable, VCXO clock generator 37. Clock generator 37 may be synchronized to the superpacket timestamp during a record mode. Data buffer 281 smoothes the bursts of superpackets to remove or substantially reduce the intervening variable duration gaps. Thus the superpackets are processed to form a nominally constant bit rate data stream for further processing within recording circuitry 28. For example, Reed Solomon error detection and correction codes may be computed and added to the buffered superpackets as illustrated in block 282. The buffered superpacket data may be stored as depicted by Format Sync Block 283. It is known to shuffle or interleave data prior to recording to mitigate effects of media damage which may result in uncorrectable errors during reproduction. The shuffling or interleaving may be carried out over the period of a recorded segment, i.e. a head scan, or an average picture interval. In addition to shuffling the data may formatted by Format Sync Block 283, to produce sync blocks having a data structure which may comprise a preamble or sync word identifying the start of the track, an identification code, the data to be recorded (superpacket) and a postamble.

Error coded, shuffled and syncblock formatted data may be further processed for record coding, in an embodiment illustrated as record block REC. CODE 284. Record coding may be used to reduce or eliminate any DC components in the data stream, and may also be used to tailor the recorded frequency spectrum of the processed superpacket signal.

The replay process performs the inverse of the record mode signal processing. The replay signal is code converted in block REC. DECODE 271, to restore the error coded, shuffled formatted data signal. The start of the data track is identified by the sync word and the data is clocked into a memory, represented by DEFORMAT SYNC BLOCK 272, to enable deformatting of the recorded shuffled structure. The memory of block 272 is read out in a manner complementary to that employed for shuffling prior to recording. Thus by shuffling and deshuffling, media derived errors are dispersed throughout the data contained in the recorded sector or track. Following deshuffling the data is error corrected in block 273 using the exemplary Reed Solomon code added during record processing. Thus output data stream 401, from replay circuitry 27, represents the buffered superpacket stream as generated by packet buffer 281. However, to enable subsequent decoding by decoder 24 of IRD 100, the buffered superpackets are restored, in block 453, to more closely represent the timing and intermittent or burst like delivery of the superpackets as formatted by IRD 100 prior to recording. Operation of superpacket restoration circuitry 450 is similar to that shown in FIG. 3B and is described following the explanation of oscillator and timestamp synchronization.

FIG. 5 illustrates an exemplary utilization of timestamps for synchronization and timing purposes in digital recorder 400. In a record mode, superpackets from one conductor of AVD bus 500 are coupled via interface switch 102 to signal sorter 202. The frame clock signal FC present on another AVD bus conductor is applied to a second input of sorter 202. An edge detector, 31, detects the transition of the frame clock signal FC which defines the start of the active frame clock interval, and responsive to such detection, captures in a latch 35 the count exhibited by a counter 36. Counter 36 counts pulses from a voltage controlled oscillator 37 which has a nominal free running frequency close to the frequency used to generate the superpacket timestamps.

Simultaneously with capturing the count value in latch 35, the edge detector 31 alerts demultiplexer controller 33 to provide a sequence of control signals for controlling demultiplexer DEMUX 30 to separate the components of the superpacket. The timestamp contained in the superpacket is separated and stored in a memory 32, for access by a clock controller 39. Depending upon the form of signal the recorder is arranged to handle, DEMUX 30 may be designed to provide the signal in a variety of formats. That is, it may provide the superpacket in toto, as illustrated in FIGS. 4A, 4B, for buffering and recording as shown in FIG. 5. Alternatively DEMUX 30 may be arranged to provide the playback rate code PB on one port which is accessed by the recorder control circuitry 29. Transport packets may be provided at another port as an alternative signal for coupling to record buffer circuitry 281.

The clock controller includes apparatus for storing successive values latched in latch 35 and successive timestamp values stored in MEMORY 32. Let the successive timestamp values be designated $TS_n$ and $TS_{n+1}$. Let corresponding successive count values stored in the latch 35 be designated $LCR_n$ and $LCR_{n+1}$. The clock controller 39 reads the successive values of TS's and LCR's and forms an error signal E proportional to the differences $$E => |TS_n - TS_{n+1}| - |LCR_n - LCR_{n+1}|$$

The error signal E, is applied as a control signal to condition the voltage controlled oscillator 37 to produce a frequency equal to the frequency of the system clock with which the timestamps were generated. The error signal E produced by the clock controller 39 may be in the form of a pulse width modulated signal, which may be rendered into an analog error signal by implementing a low pass filter 38 with analog components.

The constraints on this system are that the counters at each end of the system, namely encoder, decoder and recorder, count the same frequency or even multiples thereof. This requires that the nominal frequency of the voltage controlled oscillator be fairly close to the frequency of the system clock in the encoder.

Figure 6:
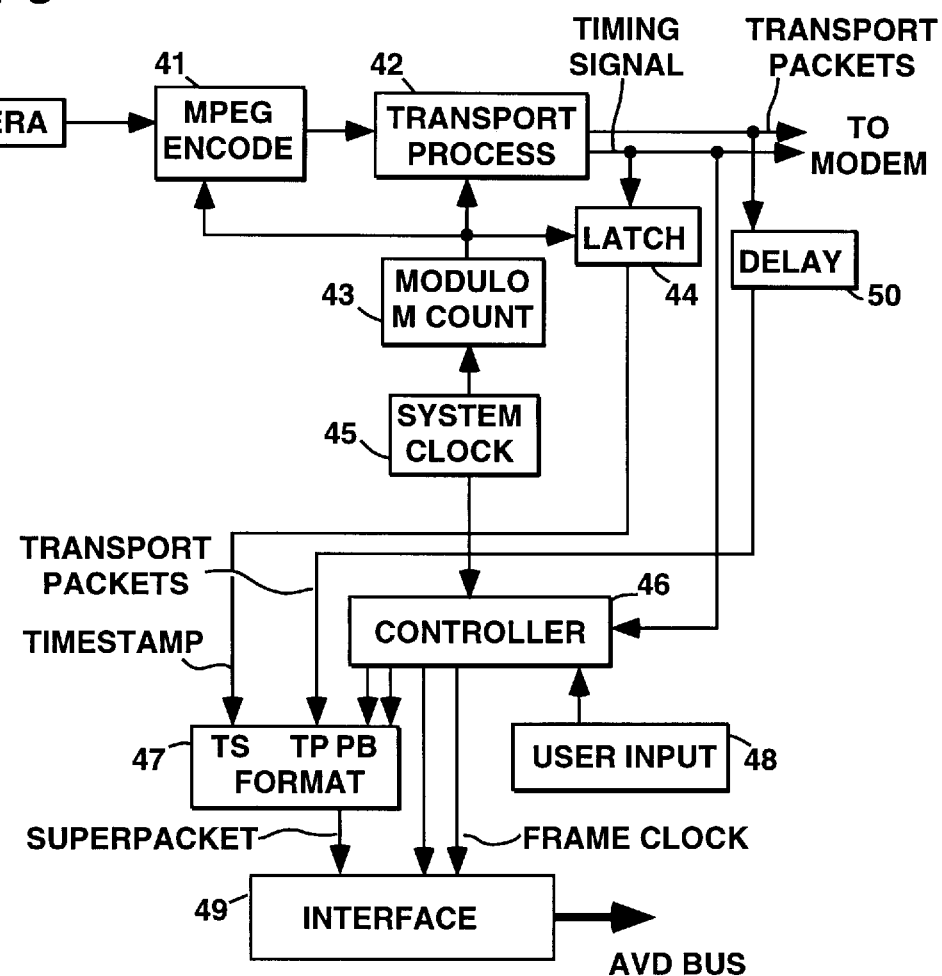
FIGS. 6 and 7 are block diagrams of apparatus for forming a superpacket.

It will be noted that the occurrence of transport packets generated as illustrated in FIGS. 3, 5 and 6, for example, are synchronous with a system clock. The system clock was in turn synchronized with to an encoder clock via PCR's located within the transport stream and derived in packet source 12. The occurrence of these transport packets are time stamped in cooperation with the receiver synchronous clock, and the respective transport packets are tagged with the timestamps before application to the AVD bus. At the recorder interface to the AVD bus, the recorder may record the superpacket and may utilize the timestamps to generate a recorder system clock which is synchronous with the transport packet and the receiver system clock.

Timestamps are samples of counts from a system clock oscillator which is assumed to run stably, without perturbation. Hence timestamp values, or oscillator samples, may be communicated for oscillator synchronization. Differences between adjacent timestamps values represent an elapsed number of oscillator cycles, which may also be considered to represent an elapsed time interval. When digital recorder 400 replays a recorded signal from media 405, VCXO 37 may not be controlled in response to reproduced timestamps. Control of oscillator 37 is not possible because, although timestamps represent numeric values sampled from a stable oscillator, the elapsed time interval represented by adjacent timestamp values is violated if the reproduced occurrence, or spacing between timestamps is not the same as when encoded. Such reproduced timing differences may, for example, result from recorder input buffering, data smoothing, reproducing mechanism instabilities, and transducer switching.

Hence when digital recorder 400 replays, oscillator VCXO 37 free runs, driving sync generator 99 which provides reference signals for the recorder mechanism and the processes of block 27. The stability of VCXO 37 and sync generator 99 is sufficient to facilitate recovery of the buffered superpackets which are output as signal 401. However, specifications for MPEG decoding, for example by decoder 24, may require that superpacket signal 401 be restored to more closely represent the timing and superpacket occurrence, as formatted by generator 98 of IRD 100. In addition, although MPEG decoder specifications may specify timing jitter tolerances, a recording and replay signal process may introduce timing perturbations beyond the clock synchronization and buffer capacity of a decoder.

Superpacket signal 401 may be advantageously restored or reformatted by utilizing the timestamps added to each superpacket. Signal 401 is coupled to demultiplexer 452 where the timestamps are extracted or copied and coupled to demultiplexer control block 451. Timestamps may be demultiplexed by, for example, counting data bits based on the superpacket structures illustrated in FIGS. 4A and 4B, and knowing where the start of replay data occurs based on the format of the recorded syncblock and associated sync word. Alternatively, during superpacket buffering, shown in block 28, a timestamp identifier may be added to provide identification during reproduction. The demultiplexer control compares the replayed timestamp value with a continuously changing counter value produced by counter 36 counting free running oscillator 37. When the value of counter 36 and the demultiplexed timestamp are equal, demux control 451 signals the start time of the replayed superpacket. Thus the encoded start time of the superpacket is restored. In addition to re-establishing superpacket start time, the bit rate of the superpacket must also be restored. To enable superpacket restoration, block 453 may comprise a storage buffer coupled to receive replayed signal 401. Superpacket restoration block 453 is clocked by pulses from oscillator 37, thus each buffered superpacket is read out when oscillator 37 count value equals the timestamp value. Hence, the beginning of each superpacket is restored to occur at the same oscillator count as when formatted by block 22. Since the superpackets have been retimed to occur at substantially the original "encoded" time, and the superpacket bit rate is substantially the same bit rate, hence the variable intervening gaps between superpackets are also restored. Thus the reproduced transport packets output from restoration block 453 are substantially as formatted and free of recorder derived timing discontinuities and perturbations. The restored superpacket signal 402 is coupled to AVD bus 500 via switch 102 which is controlled via control data pair of the bus, (note, switch 102 in FIG. 5 is illustrated in a record mode condition).

Referring to FIG. 6, a further method of generating superpackets is illustrated and will be described. In this example a camera 40 generates a video signal. This video signal is compressed in an MPEG encoder 41, and packaged in transport packets by the transport processor 42. The MPEG encoder 41 in cooperation with a system clock 45 and a modulo M counter 43, includes presentation timestamps in the compressed video signal. The transport processor 42, also in cooperation with the modulo M counter 43, includes program clock references in ones of the transport packets. The transport processor provides bit-serial transport packets of the video signal on one output port, and in parallel therewith provides a timing signal indicative of the start of successive output transport packets.

Successive transport packets are delayed in a compensating delay element 50, and then applied to a superpacket formatter 47. At the start of each new transport packet the count exhibited in the modulo M counter 43 is captured in a latch 44, the output of which is coupled to formatter 47. In addition a playback rate control code, PB, is applied from a system controller 46 to the superpacket formatter. In this example it is presumed that the camera is operating at real time and at normal speed, hence the playback rate code will reflect a playback speed equivalent to recording speed. However, the camera may operate at a higher than normal imaging rate, for example, 90 images per second. Such high rate image signals may be used to portray image movement in slow or variable motion, hence the desired viewing speed may be communicated by the playback rate control code. For example a playback rate of 1/3 will portray image motion at one third speed. The speed of camera action is controlled by a user input 48, which may define a number of variable coding and compression parameters.

When the timing signal provided by the transport processor indicates the occurrence of a new transport packet, controller 46 conditions the formatter to first output, in serial form, the reserved data block, for example 12 bits as illustrated in FIG. 4B, which includes the playback rate code. Following the reserved data block, the count from latch 44 is output in serial form to generate the timestamp. Finally the delayed transport packet from delay 50 is output in serial form to complete superpacket formatting. The delay incurred by the transport packet in the delay element 50 is equivalent to the time necessary to read out the timestamp and the playback rate code.

The superpackets are applied to a desired one of the conductors in the interface 49 under control of control signals present on the control pair of conductors of the interface. In addition controller 46 generates a frame clock signal FC which is coincident with the superpacket and which is applied to a second conductor of the AVD bus at interface 49. If controller 46 is the overall system controller, it will generate control signals which are applied to the control pair. User control 48 may provide signal selection and direction. If controller 46 is not the system controller, the only interaction with the interface will be generation of the frame clock in this example.

Figure 7:
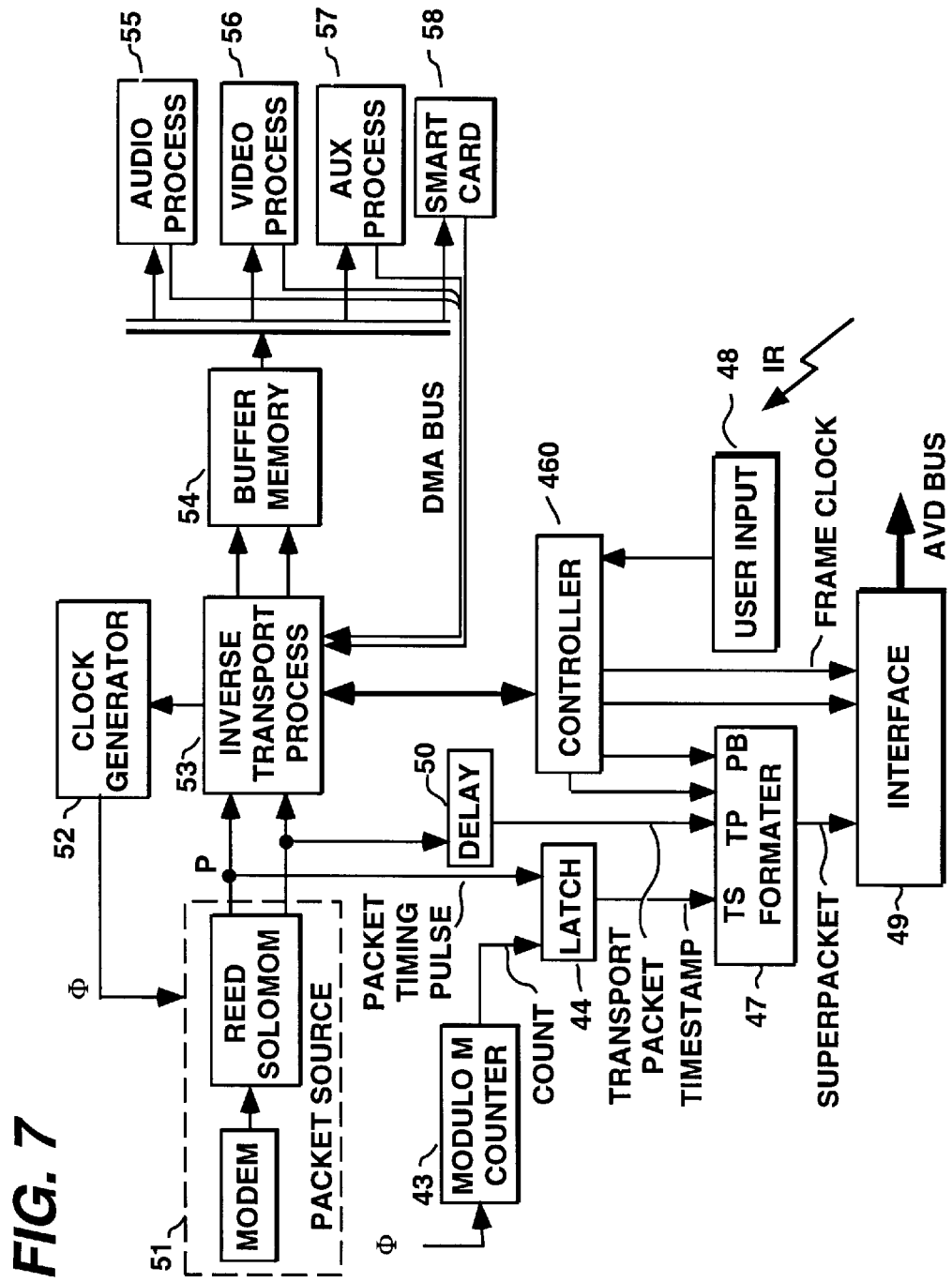

FIG. 7 illustrates a further example of a superpacket generator. In FIG. 7 elements designated with the same numbers as elements in FIG. 6 are similar and perform the same function. Transmitted transport packets are received by a modem and error corrected by a Reed Solomon decoder of the packet source 51. The packet source generates outputs pulses P, which are coincident with and indicate the occurrence of respective transport packets. The pulses P and the transport packets are applied to an inverse transport processor 53. In this example it is assumed that the signal applied to the packet source contains time division multiplexed packets pertaining to different programs and different program components. Respective packets contain program identifiers, PID's, by which they are associated with respective programs or program components. The transport processor is conditioned to select only packets associated with a desired program. The payloads of these packets are applied via a direct memory access, DMA, to a buffer memory 54. Respective program component payloads are applied to specific areas of the buffer memory. As respective program component processors 55, 56, 57 and 58 require component signal data, they request same from the processor 53, which reads the appropriate payload via the DMA structure.

Ones of the transport packets contain program clock references, PCR's, which precisely relate the creation of the transport packet to the encoder system clock at generation. The transport processor 53 extracts these PCR's and applies them to a system clock generator 52. Using the PCR's, clock generator 52 generates a system clock which is frequency locked to the encoder system clock. The system clock is utilized by the inverse transport processor 53 and the packet source 51, hence the transport packets are relatively synchronized with their original creation timing.

The system clock is counted by modulo M counter 43, and the count value exhibited by the counter when a pulse P occurs, i.e. when the start of a new transport packet is output by the packet source, is captured by latch 44 responsive to pulse P. This latched count value is utilized as a timestamp. In addition, the associated transport packet is applied to a compensating delay element 50. The delayed transport packet from element 50, the counter value or timestamp from latch 44, and a playback rate code from a controller 460 are applied to respective input ports of a superpacket formatter 47.

The controller 460, under user control 48, communicates with the inverse transport processor to designate which program transport packets are to be packaged in superpackets. On the occurrence of respective transport packets, the inverse transport processor provides a pulse to the controller 460 whenever a received packet is a desired transport packet. Responsive to this pulse the controller 460 conditions the formatter to form the superpacket with the current timestamp, PB and transport packet. Note in this example the delay element 50 must accommodate not only the formation time of the first two data elements of the superpacket but also the time required of the inverse processor to ascertain that a packet is the one which is desired.

In the foregoing examples the timestamp is generated at the occurrence of a transport packet. Alternatively timestamps may be generated relative to the timing of generation of the superpacket. That is, the timestamp may define the instant a superpacket is to be output, or the instant assembly of the superpacket begins. In these instances the time stamp will generally be related to the leading edge of the Frame Clock, though it may not define the timing of this transition. The timestamp will still be associated with a particular transport packet because superpackets are generated to convey respective transport packets.

The frame clock FC is not a fixed frequency signal. That is, the inactive portion of the frame clock has a specified minimum and maximum duration. It is specifically desired that the frame clock not be a fixed frequency clock so that superpackets may be formed at any time a transport packet is available. It is undesirable to use a fixed frequency frame clock, since this may force a delay in the formation of a superpacket for transport packets that occurred after the beginning of an active portion of the frame clock until the subsequent cycle of the frame clock. If the timestamp is to be related to the formation of superpackets or the frame clock, then latches 44 in FIGS. 6 and 7 may be conditioned to capture count values by either the formatters 47 or the controllers 46 or 460 respectively.

Figure 8:
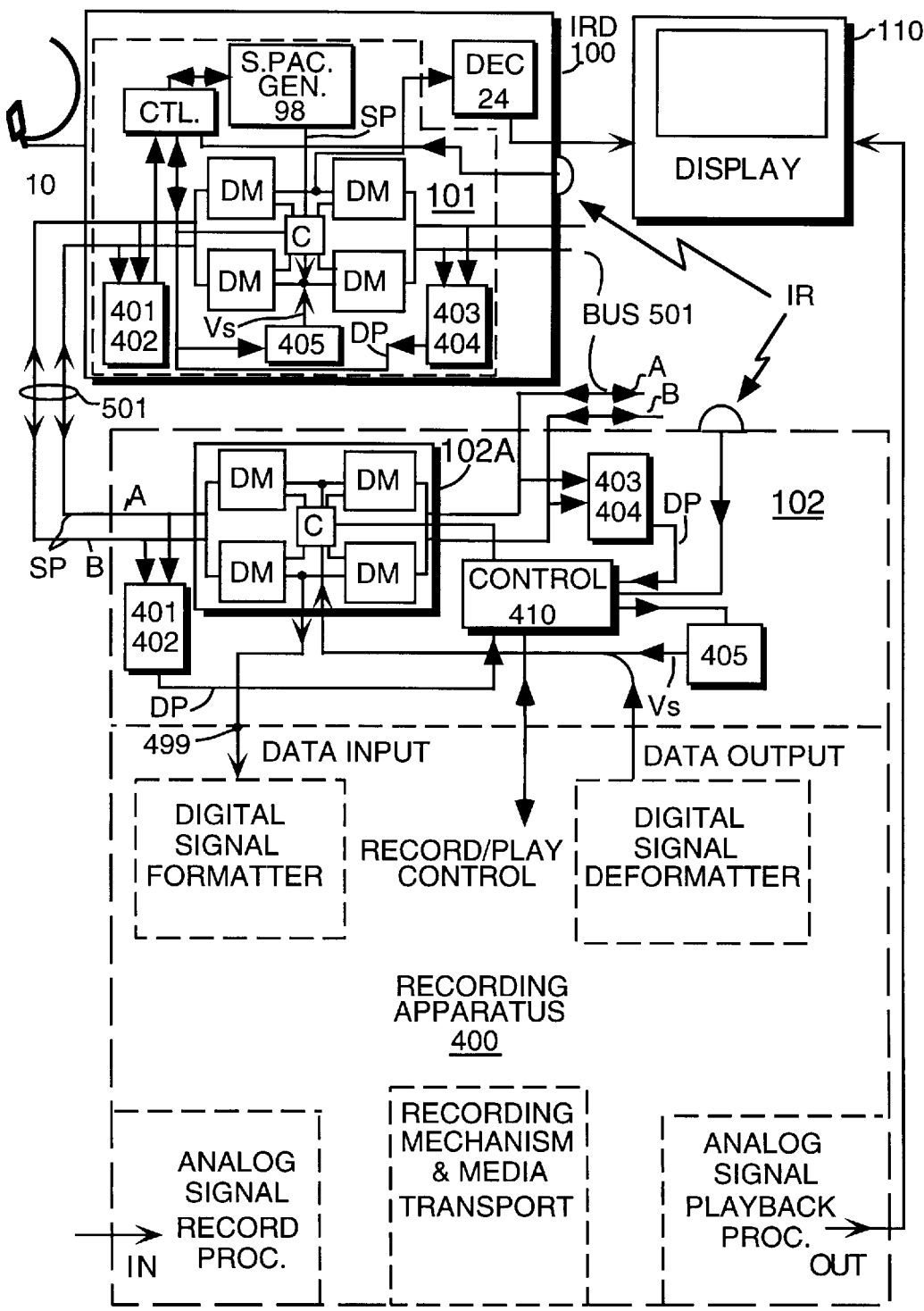
FIG. 8 is a further system block diagram including a digital recording and replay device and employing various inventive embodiments.

A second exemplary audio-video-data AVD bus system is illustrated in FIG. 8. This second exemplary AVD system employs a simplified daisy chained bus 501 for coupling between an IRD 100, digital recorder 400 and a display 110. This simplified bus has only two conductor pairs A/B with switch control logic C incorporated at each interface switch matrix 101/102. The switch control logic C monitors in conjunction with detectors 401, 402, 403, 404, the state of each pair of bus 501 and in response to user selected status, for example, playback or record modes, automatically determines an appropriate signal routing via bus 501. In simple terms, the switch control logic ensures that sources of signals are only coupled to signal destinations, for example input terminal 499 of recorder 400, and that only one signal source at a time is coupled to a bus pair. The presence of a data signal on a bus pair is indicated by an indicia Vs. When indicia Vs is detected a control signal DP is coupled to the switch control logic to prevent two signals attempting to occupy the data bus. Indicia Vs may be generated, as shown in exemplary FIG. 9, by element 405 and may be detected by element 401.

Figure 9:
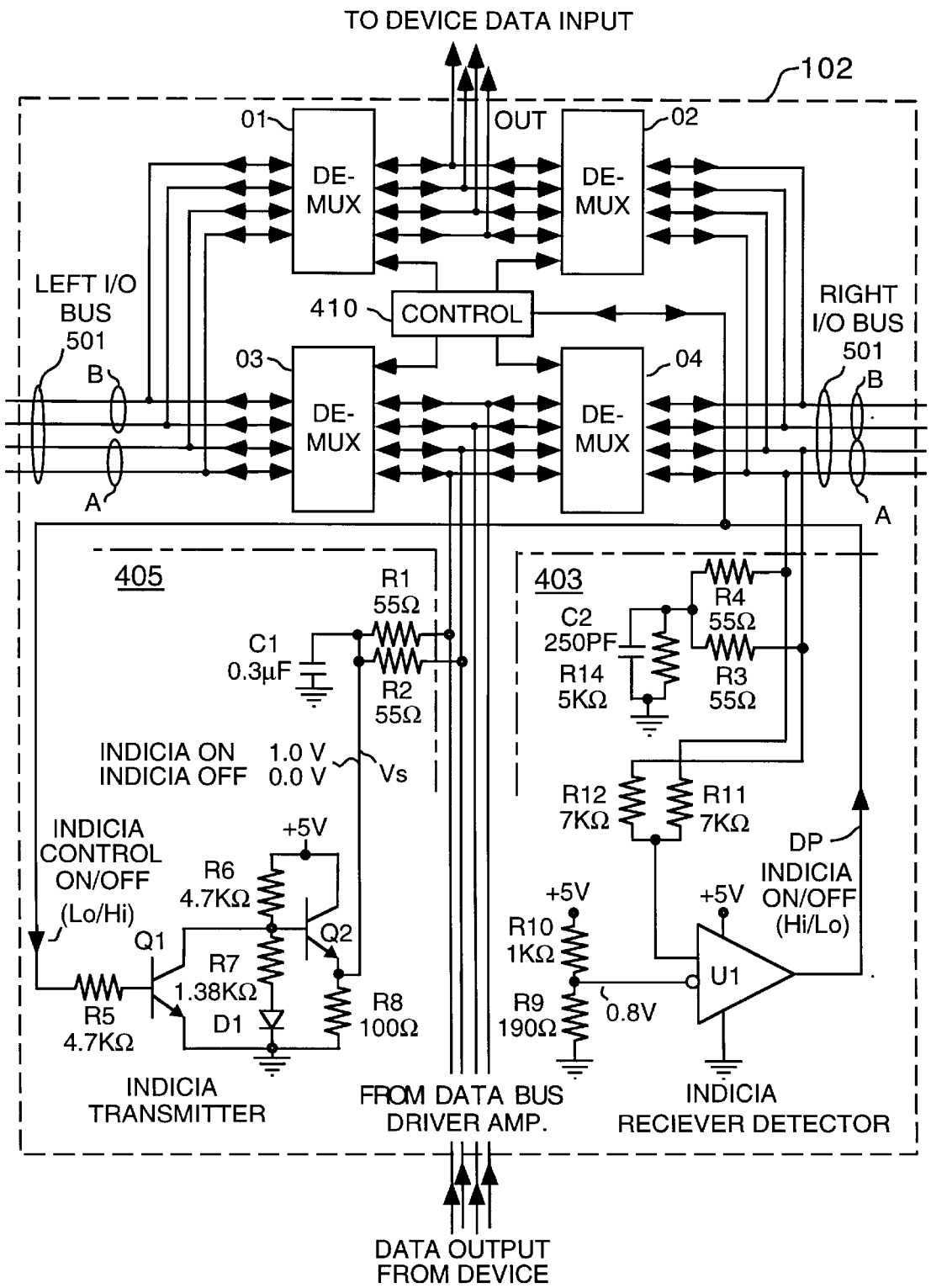
FIG. 9 is a circuit diagram of an inventive controller advantageously used in FIGS. 8 and 10.

FIG. 9 illustrates a data bus transmitter and receiver employing an inventive bus status indicator and detector. Ones of the inventive transmitter circuit are coupled to each input of the interface switch. Ones of the inventive receiver/detector circuitry are coupled to each bus line coupled to the interface switch. The theory and operation of balanced line driving and reception techniques is well known. The inventive data indicia transmitter 405 and detector 401 utilize the balanced transmission condition to introduce a DC voltage data indicia Vs, equally into each conductor of the bus pair with reference to ground. At a receiving bus node the presence of the data indicia Vs is detected by an indicia detector, for example receiver detector 403, which forms part of switch control logic C. Thus the presence of a data signal is indicated for coupling to a destination via the interface switch matrix.

In FIG. 9 a single indicia transmitter 405 is shown coupled to an input line pair A of data bus 501. However, a system employing the inventive control method requires that an indicia transmitter is included or is associated with each possible data source. Indicia transmitter 405 comprises a switched emitter follower Q2 which is coupled equally into each conductor of line pair A. A transistor Q1 functions as a switch coupled between the base of emitter follower Q2 and ground. An indicia control signal is coupled to the base terminal of transistor Q1 via a resistor R5. The indicia control signal may be generated, or derived from control logic in response to a device operating mode command, for example, initiation of Play mode in a digital player recorder. In an exemplary Play mode, a logical low or nominally zero volt signal is applied to resistor R5 from control logic 410. The nominally zero volt signal turns off transistor Q1 which allows the base terminal of transistor Q2 to assume a potential of approximately 1.6 volts, determined by the series combination of resistors R6, R7 and diode D1. The emitter follower action of transistor Q2 results in an emitter voltage Vs, of approximately 1 volt, which is applied the data bus conductors via resistors R1 and R2. In non-replay modes a logical high or nominally 5 volt signal is generated by logic 410 and applied to resistor R5. The nominally 5 volt signal, coupled via resistor R5, turns on transistor Q1 which clamps the base terminal of transistor Q2 to ground. Thus transistor Q2 is turned off and no indicia or sensing voltage Vs is generated.

A single indicia detector 403 is shown in FIG. 9 coupled to a bus pair A of data bus 501. However, a system employing the inventive control method requires that an indicia detector is provided for each data bus pair coupled to a switch matrix. Indicia detector 403 comprises a balancing network formed by resistors R3 and R4 coupled from each bus line to a parallel combination of a resistor R14 and a capacitor C2 connected to ground. Resistors R11 and R12 are connected to each bus line and are joined at a non-inverting input of an integrated circuit comparator amplifier U1. An inverting input of integrated circuit U1 is connected to a DC potential divider formed by resistors R8 and R9, coupled between +5 volts and ground and generating a voltage of about 0.8 volts. When data indicia Vs is absent the data bus sits at nominally ground or zero volt potential. This nominally ground potential is coupled via resistors R11 and R12 to the non-inverting input of IC U1. Thus with zero volts applied to the non-inverting input and 0.8 volts applied to the inverting input the output terminal of IC U1 assumes a low, nominally ground potential. When data indicia Vs is present the data bus is nominally 1 volt positive relative to ground potential. The +1 volt DC indicia signal applied to the non-inverting input of IC U1 causes the output terminal to assume a high, nominally supply rail potential. Thus integrated circuit U1 output signal DP indicates a data bus signal presence with a high level signal and a data bus signal absence with a low level output signal.

TABLE 1 illustrates an advantageous automated interface switch apparatus controller associated with a digital recorder, for example, D-VHS. The recorder mode is determined by user command, for example by manual switch operation or IR remote control. Control logic associated with the interface switch apparatus and digital recorder determine the user desired mode and establish connection between the appropriate exemplary D-VHS input or output terminal and an appropriate bus conductor.

TABLE 1

DIGITAL PLAYER/RECORDER AUTO SWITCHING MATRIX

| | STATUS OF BUSSES A/B | | |
|---|---|---|---|
| DIGITAL Player/Recorder MODE | 0/0 | 0/1 | 1/0 |
| RECORD | WAIT | B—>IN<br>B—>A | A—>IN<br>A—>B |
| REPLAY | OUT—>A<br>OUT—>B | OUT—>A | OUT—>B |
| OFF | OPEN | B—>A | A—>B |

Operation of the automated interface switch apparatus is as follows. For example, upon selection of a replay mode, transmitter 405 circuitry of FIG. 8 is enabled and DC sensing voltage indicia Vs is applied to the output of a bus driver amplifier (not shown). Indicia detectors 401/402, associated with control logic of the automated interface switch 102, determine the presence, or absence of an indicia Vs on bus lines A or B and couple the output replay data and DC indicia voltage Vs to which ever bus line is not currently utilized i.e. has no DC sensing voltage present as detected and represent by signal DP. Thus in exemplary TABLE 1, assuming the digital player/recorder is in a replay mode and bus status is 0/0, signifying no signals are present on either bus conductor, replay data from digital player/recorder, for example D-VHS, is coupled to both conductors A and B.

If digital player/recorder 400 is controlled to assume a record mode the automated interface switch apparatus functions as follows. The control logic associated with the automated interface switch 102 determines the presence or absence of a data indicia Vs on bus line A or B, as an indicator of data signal presence. Thus in TABLE 1, bus status 1/0 indicates that a data signal is present on bus A and this data signal is connected to a recording input 499 of the exemplary D-VHS digital recorder. Similarly, if the data signal indicia is present on bus B, the automated coupling connects the recording input to bus B.

An inventive aspect of the automated interface switch apparatus occurs when a record mode is selected for the digital player/recorder but data signals are not present on either bus A or B, i.e. bus status 0/0. A condition such as described may occur when the transmission of the specific program selected for recording is delayed. Under this condition TABLE 1 indicates a WAIT or record paused condition is applied to the recorder. The control logic associated with the automated interface switch may inhibit initiation of the user selected record mode until a data signal indicia Vs is detected on either bus conductor and exemplary control signal DP assumes a logical high state. The detected data indicia Vs controls coupling of data to the recording input, for example 499, and in addition may enable initiation of the pre-selected record mode. Thus, the advantageous control logic and data indicia prevents unnecessary consumption of recording media and ensures the desired program is recorded without the use of a separate control bus or IR blaster.

Figure 10:
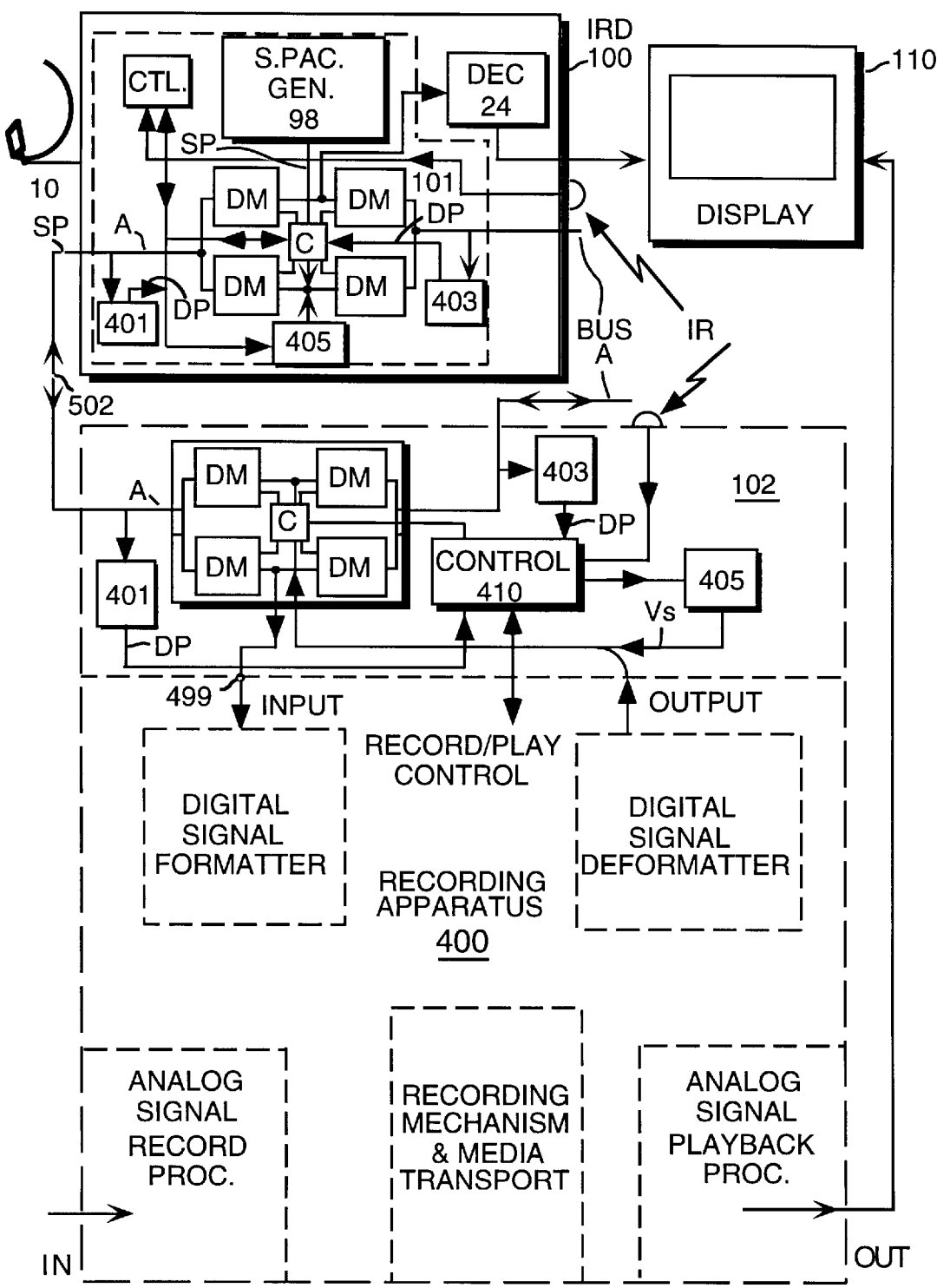
FIG. 10 is another system block diagram including a digital recording and replay device and employing various inventive embodiments.

A third exemplary audio-video-data AVD bus system is illustrated in FIG. 10. FIG. 10 shows a simplified single pair daisy chained bus which couples between a digital recorder 400, IRD or DSS receiver 100 and display 110. Advantageous automated controllers C are coupled to interface switch apparatus 102 associated with a digital recorder 400, for example D-VHS, and interface switch apparatus 101 associated with receiver 100 and display 110. TABLE 2 illustrates the automated functions of controller C of interface switch 101 associated with an exemplary DSS™ receiver 100 and an exemplary data signal source digital recorder/player 400, for example, D-VHS. The receiver mode is determined by user command, for example by manual switch operation, not shown or IR remote control. The receiver may be controlled to output data to, or receive data from the single pair bus A. Control logic associated with the interface switch apparatus and digital recorder determine the user desired mode and establish connection between bus conductor A and the appropriate input or output terminal of receiver 100.

TABLE 2

RECEIVER AUTO SWITCHING MATRIX

| RECEIVER MODE | STATUS OF BUS A | |
|---|---|---|
| | 0 | 1 |
| OUTPUT RECEIVED DATA | OUT—>A | OUT—>IN |
| DATA INPUT (REPLAYED DATA) | OUT—>A | OUT—>A |
| OFF | OPEN | OPEN |

Operation of the automated interface switch apparatus is as follows. For example, the user determines that the receiver will receive and output a specific program data stream. The control logic associated with automated interface switch 101, of receiver, 100 determines the presence or absence of a data signal indicia, for example the DC sensing voltage Vs, on bus line A. Exemplary indicia detectors 401, 403 detect the presence of indicia Vs and generate a control signal DP which is coupled to the control logic of interface switch 101. An absence of an indicia on bus line A indicates that digital recorder/player 400 is not outputting data and consequently bus line A is available for transmission of receiver 100 output data. The receiver output data is also coupled to the receiver decoder 24 input for decoding and coupling for display. When the user initiates a replay mode by recorder player 400, controller 410 generates a play command, and in addition enables generation of data indicia Vs. Indicia Vs is added to the replay data stream which is coupled, for example, to the automated interface switch 102. Indicia detectors, for example, 401/213/4 of FIG. 8 or 401/3 of FIG. 10 determine the absence of an indicia Vs on, for example bus line pair A, and enable coupling of the data stream and indicia to bus pair A. Indicia detectors, for example 401, 403 associated with interface switch apparatus 101 of receiver 100 detect the presence of indicia voltage Vs. The exemplary detectors 401, 403 and generate a control signal DP which enables coupling of the replay data from bus conductor A for decoding by decoder 24, and display by monitor 110. Thus the simple, single pair bus may provide automated coupling between two sources and a monitoring input without the use of a control bus conductor.

We claim:

1. An apparatus (100) for controllably coupling a source (98) of a packetized signal (SP) to a data bus (501), said apparatus comprising:
    an indicia generator (405) controllably coupled to said source (98) and receiving therefrom said packetized signal (SP);
    a switching matrix (101) controlled responsive to said indicia generator (405) for receiving therefrom said packetized signal (SP) for coupling to said data bus (501), and,
    responsive to said controllable coupling from said source (98) said indicia generator (405) adds an indicia (Vs) to said packetized signal (SP) and enables said switching matrix (101) for coupling said packetized signal (SP) and indicia (Vs) to said data bus (501).

2. The apparatus of claim 1, wherein said indicia (Vs) is a voltage added to said packetized signal (SP).

3. The apparatus of claim 1, wherein said indicia (Vs) is added to said packetized signal (SP) with reference to a zero signal conductor.

4. The apparatus of claim 1, wherein said indicia generator (405) is controlled responsive a control mode of said packetized signal source (98).

5. The apparatus of claim 1, wherein said switching matrix (101) includes a detecting means (401,402,403,404) for detecting a second packetized signal and indicia present on said data bus (501) and responsive to detecting said second packetized signal and indicia, said detecting means (401,402,403,404) inhibits control of said switching matrix (101) responsive to said indicia generator (405).

6. The apparatus of claim 1, wherein said packetized signal (SP) has MPEG like characteristics.

7. An apparatus (102) for coupling a data bus (501) having a packetized signal (SP) to a signal receiving device (400), said apparatus comprising a detector (401,402,403,404) for receiving said packetized signal (SP) from said bus (501) and controlling a switch (102A) for coupling said packetized signal (SP), said packetized signal including an indicia (Vs) and responsive to said indicia (Vs) said detector (401,402, 403,404) generates a control signal (DP) for enabling said switch (102A) and coupling said packetized signal (SP) to an input (499) of said signal receiving device (400).

8. The apparatus of claim 7, wherein said control signal (DP) is coupled to control said signal receiving device.

9. The apparatus of claim 7, wherein responsive to said packetized signal (TS) including said indicia (Vs) said detector (401,402,403,404) generates said control signal (DP) for initiating a recording mode by said signal receiving device (400).

10. The apparatus of claim 7, wherein said indicia (Vs) comprises a voltage added to said data bus (501) with reference to a zero voltage reference.

11. The apparatus of claim 7, wherein said indicia (Vs) comprises a DC voltage.

12. The apparatus of claim 7, wherein said packetized signal (SP) is substantially similar to an MPEG signal.

13. A recording apparatus (400) for processing a packetized signal (SP), said apparatus comprising;
   a signal receiving means (102) for receiving said packetized signal (SP), said packetized signal (SP) including an indicia (Vs);
   a detecting means (401,402,403,404) coupled to said receiving means (102) for detecting said packetized signal (SP) including an indicia (Vs) and generating a control signal (DP) responsive to said indicia (Vs);
   a controller (410) controllably coupled to said detecting means (401,402,403,404) for controlling an operational mode of said recording apparatus (400) responsive to said control signal (DP).

14. The apparatus of claim 13, wherein said packetized signal (SP) is generally MPEG like.

15. An apparatus for coupling a packetized signal (SP) between a signal source (98) and a signal destination (499, 400), said apparatus comprising:

a first switching matrix (101) for controllably coupling said packetized signal (SP) from said signal source (98);

a data bus (501) coupled to said first switching matrix (101) and receiving therefrom said packetized signal (SP);

a second switching matrix (102) for controllably coupling said packetized signal (SP) from said data bus (501) to said signal destination (499);

an indicia generator (405) coupled to said signal source (98) and controllably coupled to said first switching matrix (101), an indicia detector (401,402,403,404) coupled to said data bus (501) and controllably coupled to said second switching matrix (102);

said indicia generator (405) adds an indicia (Vs) to said packetized signal (SP) and controls said first switching matrix (101) for coupling said packetized signal (SP) and indicia (Vs) to said data bus (501);

said indicia detector (401,402,403,404) detects said indicia (Vs) and said packetized signal (SP) and controls said second switching matrix (102) for coupling said packetized signal (SP) and indicia (Vs) to said signal destination (499).

16. The apparatus of claim 15, wherein said indicia generator (405) adds said indicia (Vs) to said packetized signal (SP) responsive to an operational mode of said signal source (98).

17. The apparatus of claim 15, wherein said indicia generator (405) adds said indicia (Vs) to a conductor (A,B) comprising said data bus (501) coupling said packetized signal (SP) to said first switching matrix (101).

18. The apparatus of claim 15, wherein said indicia (Vs) is a voltage added to said data bus (501) and referenced a zero signal conductor.

* * * * *

UNITED STATES PATENT AND TRADEMARK OFFICE
CERTIFICATE OF CORRECTION

PATENT NO : 5,841,987
DATED : Nov. 24, 1998
INVENTOR(S): Harold Blatter; William Wesley Beyers Jr. and Michael Scott Deiss It is certified that error appears in the above-identified patent and that said Letters Patent is hereby corrected as shown below:

Delete claims 7-14.

Signed and Sealed this

Thirtieth Day of March, 1999

Attest:

Q. TODD DICKINSON

Attesting Officer    Acting Commissioner of Patents and Trademarks